United States Patent [19]

Rogers, Jr.

[11] 4,274,220
[45] Jun. 23, 1981

[54] FISHING LURE

[76] Inventor: Thurmond J. Rogers, Jr., 7245 Fairbanks N., Houston, Tex. 77040

[21] Appl. No.: 62,721

[22] Filed: Aug. 1, 1979

[51] Int. Cl.³ .......................................... C10L 11/08
[52] U.S. Cl. ......................................... 43/35; 43/42.41
[58] Field of Search ................................. 43/34–37, 43/42.41

[56] References Cited

U.S. PATENT DOCUMENTS

| | | | |
|---|---|---|---|
| 1,204,538 | 11/1916 | Belding | 43/37 |
| 1,556,297 | 10/1925 | Moore | 43/35 |
| 2,256,088 | 9/1941 | Hogan | 43/35 |
| 2,456,665 | 12/1948 | Adams | 43/35 |
| 2,619,756 | 12/1952 | Hunicke | 43/35 |
| 2,896,355 | 7/1959 | Dean et al. | 43/35 |
| 2,968,113 | 1/1961 | Multanen | 43/37 |
| 3,418,743 | 12/1968 | Halvorsen | 43/37 |
| 3,492,753 | 2/1970 | Richard | 43/35 |
| 3,497,985 | 3/1970 | Margulies | 43/35 |
| 3,646,699 | 3/1972 | Zeman | 43/35 |
| 3,665,634 | 5/1972 | Baud | 43/35 |
| 3,739,517 | 6/1973 | Schleif | 43/35 |
| 3,786,587 | 1/1974 | Niileksela | 43/35 |
| 3,816,953 | 6/1974 | Hameen-Anttila | 43/35 |
| 4,024,668 | 5/1977 | McDiarmid | 43/35 |

OTHER PUBLICATIONS

Popular Mechanics, March 1949, p. 178.

Primary Examiner—Harold D. Whitehead
Assistant Examiner—K. Bradford Adolphson
Attorney, Agent, or Firm—Neal J. Mosely

[57] ABSTRACT

A fishing lure is provided which is snag-free and equipped with pivotted hooks retracted elastically within the body of the lure and movable outside the lure by action of a fish biting and pulling thereon. The lure comprises a body portion having a plurality (preferably four) hooks pivotally mounted therein and movable between a retracted position within and an extended position outside said body. The hooks are normally held in the retracted position by suitable elastic means, such as a rubber band, and moved to an extended position outside the body portion of the lure by longitudinally movable actuating means secured and guided in the body portion and actuated by a fish biting and pulling thereon. The fishing lure is particularly characterized by the fact that the hooks are always biased elastically toward the retracted position and at no point are spring-loaded outward and further in the particular features of construction that permit simultaneous actuation of four fishing hooks.

1 Claim, 5 Drawing Figures

FISHING LURE

BACKGROUND OF THE INVENTION

1. Field of the Invention

This invention relates to new and useful improvements in fishing lures, and, more particularly, to snag-free lures having retractable fish hooks.

2. Brief Description of the Prior Art

Fishermen are well aware that many of the best fishing waters include various underwater obstructions and debris that make fishing in such waters difficult. There has been a substantial need for artificial fishing lures which are free from snagging on underwater obstructions.

There have been a number of attempts at designing artificial fishing lures which have retractable fishing hooks but most lures of this type have been ones with spring-loaded hooks which are released by a trigger mechanism. Devices of this type are considered unsportsmanlike and, in some jurisdictions, are illegal.

Dean, U.S. Pat. No. 2,896,355, discloses a fishing lure with two retracted hooks which are spring-loaded toward an open or extended position. A spring-loaded latch or trigger secures the spring mechanism from operating and is releasable by an auxiliary line and allows the spring mechanism to extend the hooks.

Zeman, U.S. Pat. No. 3,646,699, discloses a fishing lure with a single hook which is pivotally supported in the body portion of the lure spring biased toward an extended position, and provided with a releasable pin or latch to permit spring operated outward movement of the hook.

Niileksela, U.S. Pat. No. 3,786,587, discloses a fishing lure with a pair of retractable hooks positioned in the body thereof and has a spring operated mechanism movable longitudinally of the body to extend the hooks when a catch or trigger is released by pull of fish thereon. This lure requires hooks that will flex almost straight when pulled inside the body of the lure.

Hameen-Anttila, U.S. Pat. No. 3,816,953, discloses a fishing lure having a body portion with a pair of hooks pivotally supported on a member longitudinally movable therein. The longitudinally movable member is spring-loaded toward a position with the hooks extended that has an initially retracted position secured by a releasable latch or trigger. The fishing line is connected to the latch or the trigger so that the pull of a fish on the line releases said longitudinally movable member to spring the hooks to an extended position.

McDiarmid, U.S. Pat. No. 4,024,668, discloses a fishing lure having a body portion with a pair of hooks pivotally supported on a fixed member therein and having leaf springs biasing the hooks to a retracted position. A pair of lines are connected to said leaf spring on a movable member connected to the fishing line. When the lure is pulled by a fish, the leaf springs are pulled inward and move the hooks outward to an extended position. In one embodiment, the leaf springs extend outside the body of the lure while in another embodiment the leaf springs are entirely within the lure body.

OBJECTS OF THE INVENTION

One of the objects of this invention is to provide a new and improved snag-free fishing lure.

Another object of this invention is to provide a snag-free fishing lure having retractable fishing hooks which are elastically biased toward a retracted position and movable toward an extended position upon occurrence of a pull on the lure body.

Other objects of this invention will be apparent from time to time throughout the specification and claims as hereinafter related.

SUMMARY OF THE INVENTION

The above objects and others are obtained by the fishing lure of this invention. A novel fishing lure is provided which is snag-free and equipped with pivotted hooks retracted elastically within the body of the lure and movable outside the lure by action of a fish biting and pulling thereon. The lure comprises a body portion having a plurality (preferably four) hooks pivotally mounted therein and movable between a retracted position within and an extended position outside said body. The hooks are normally held in the retracted position by suitable elastic means, such as a rubber band, and moved to an extended position outside the body portion of the lure by longitudinally movable actuating means secured and guided in the body portion and actuated by a fish biting and pulling thereon. The fishing lure is particularly characterized by the fact that the hooks are always biased elastically toward the retracted position and at no point are spring-loaded outward and further in the particular features of construction that permit simultaneous actuation of four fishing hooks.

DESCRIPTION OF THE PREFERRED EMBODIMENTS

Figure 1:
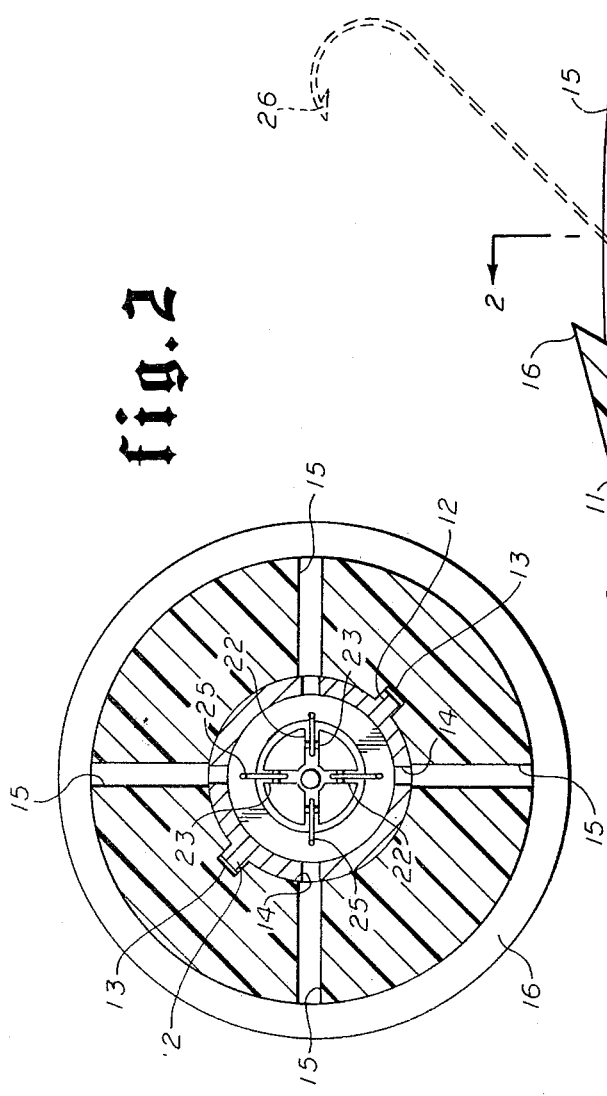
FIG. 1 is a view in longitudinal section of one preferred embodiment of a fishing lure having elastically retracted fishing hooks.
Figure 2:
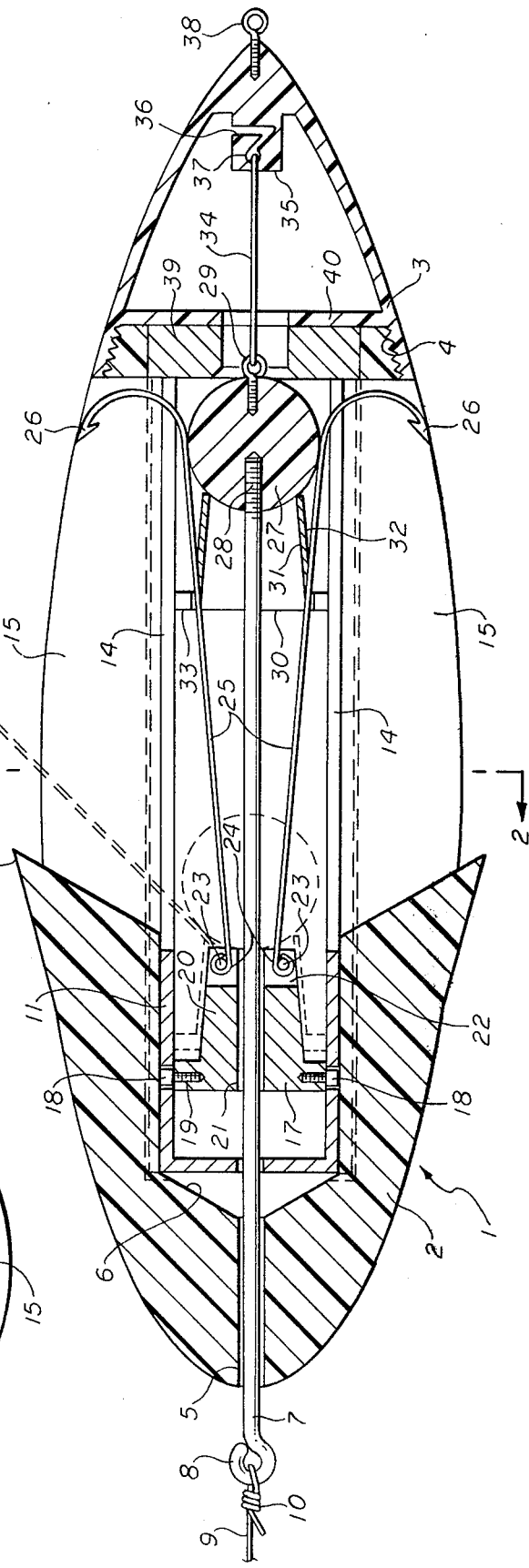
FIG. 2 is a transverse sectional view taken on the section line 2—2 of FIG. 1.

In FIGS. 1 and 2, there is shown one preferred embodiment of an improved fishing lure with retractable hook. Fishing lure 1 comprises a body portion having a front section 2 and rear section 3 threadedly connected at 4. The front body section 2 is hollow and has a passage 5 at the leading end which extends into interior body cavity 6. A rod 7 extends into body cavity 6 through passage 5 and has an eye 8 at the outside to which the fishing line 9 is tied by a suitable knot 10. A tube or sleeve member 11 fits in body cavity 6 and has ribs or flanges 12 which fit in slots 13 in leading body portion 2. Tube or sleeve 11 has a plurality of slots 14 therein which are aligned with slots 15 in body portion 2. There are, preferably, four of the slots 14 and 15, respectively, although the lure may be designed with two slots or three slots equally spaced around the periphery thereof to accomodate a particular number of hooks used in the lure. Body portion 2 has a peripherally extending portion 16 which functions as a deflector to keep debris away from slots 15 as the lure is pulled through the water.

A supporting member 17 is positioned in tube 11 and secured in place by screws 18 which extend into a peripherally extending flange 19. Supporting member 17 has a longitudinally extending portion 20 and a central passage or aperture 21 through which supporting rod 7 extends. The outer end of extending portion 20 or supporting member 17 is provided with a plurality of slots 22 in which there are positioned pivot pins 23 which support the pivot and the portions 24 of fish hooks 25. Fish hooks 25 are pivotally supported for movement of the hook end portions 26 thereof into and out of slot 15 in body 2 of the fishing lure.

Toward the trailing end of the fishing lure, inside guide tube or sleeve 11, there is positioned a movable member or assembly comprising a ball-shaped member 27 in which the threaded end 28 of rod 7 is secured. The other side of ball member 27 is provided with an eyelet member 29 threadedly secured therein. In the position shown in FIG. 1, the hook ends 26 or fish hooks 25 rest against ball shaped member 27. A retraction member 30 is secured to and integral with ball member 27 for movement thereby and includes a tubular portion 31 having slots 32 extending up to a peripherally extending flange or ring portion 33. Fish hooks 25 extend through slots 32 and are surrounded by the flange or ring portion 33 so that movement to the right (toward the trailing end of the lure) causes ring portion 33 to pull hooks 25 into a retracted position within slots 15. Eyelet member 29 on ball member 27 is secured by an elastic band 34, preferably a rubber band, which is connected to supporting member 35 in trailing body portion 3 of the fishing lure assembly. Supporting member 35 has a slot 36 and eyelet portion 37 for assembly of elastic band 34 thereon. Trailing end portion of the lure body portion 3 has an eyelet member 38 for supporting fish attracting objects.

When the fishing lure 1 is being assembled, body portions 2 and 3 are separated and tubular member 11 is positioned with slots 14 aligned with body member slots 15 by coaction of ribs 12 and slots 13. Rod member 7 is secured in ball member 27 and elastic band 24 is secured between eyelet 29 and supporting member 25 in preparation for assembly. Member 39 is positioned between the end of tube or sleeve 11 and end wall 40 of trailing body member 3 and secures tube or sleeve 11 tightly in place. If desired, member 39 can be made integral with wall member 40.

In the position shown in FIG. 1, ball member 29 is pulled to the extreme right or trailing end of the fishing lure by elastic band 34. This pulls member 31 and retraction flange or ring 33 to the right and causes fish hooks 25 to be retracted to the position shown with hook ends 26 retracted within slots 15. In this position, the fishing lure may be pulled through the water without danger of snagging on underwater obstacles. When a fish strikes the lure, and pulls on it, the lure body is pulled relative to rod 7 and ball member 27 and retraction member 30 are moved to the left or toward the leading end of the lure. As ball member 27 moves toward the leading end of the lure, it slides along the inner side of fish hook 25 and moves the hook end portions 26 outward as the hooks 25 pivot on pivot pins 23. In the most extreme position, ball member 27 is moved to the position shown in dotted line and hooks 25 are deflected outward as shown in dotted line.

From the foregoing description it is seen that the fish hooks are initially retracted in slots 15 and held in that position by action of elastic band 34 pulling ball member 27 toward the trailing end of the lure. This causes retracting ring or flange 33 to pull hooks 25 to the position shown. The hooks 25 are therefore elastically biased toward a retracted position. They are not spring loaded toward an extended or open position and reach the extended or open position only by continued pull of a fish on the lure body. This embodiment of the fishing lure has the advantage of retractable hooks which are not spring loaded toward an open or extended position and which are actuated by pull of the fish on the lure body. This is considered to be a more sportsmanlike lure and is not subject to the legal objections sometimes encountered in the use of lures having hooks that are spring loaded to an outward or extended position, and released by a trigger mechanism.

ANOTHER EMBODIMENT

Figure 5:
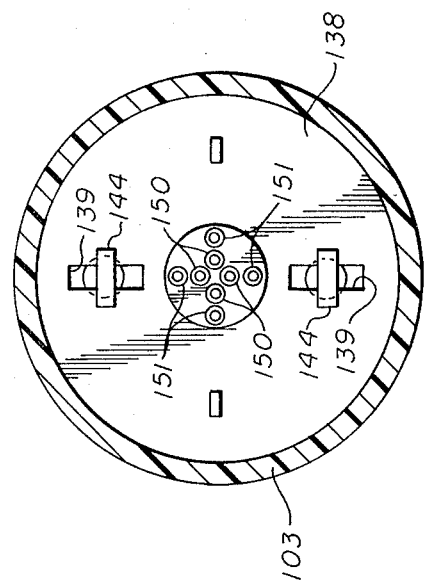
FIG. 5 is a transverse sectional view taken on the line 5—5 of FIG. 3.
Figure 4:
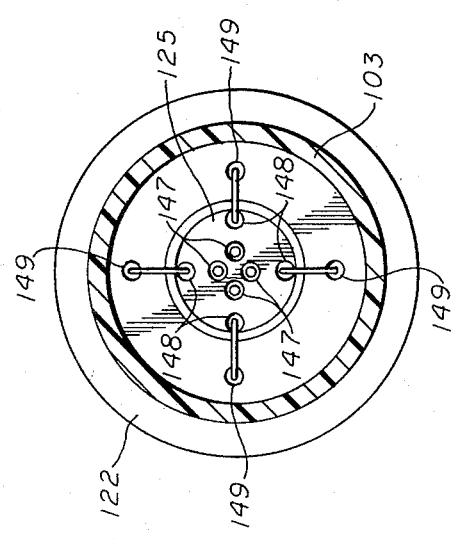
FIG. 4 is a transverse sectional view taken on the line 4—4 of FIG. 3.
Figure 3:
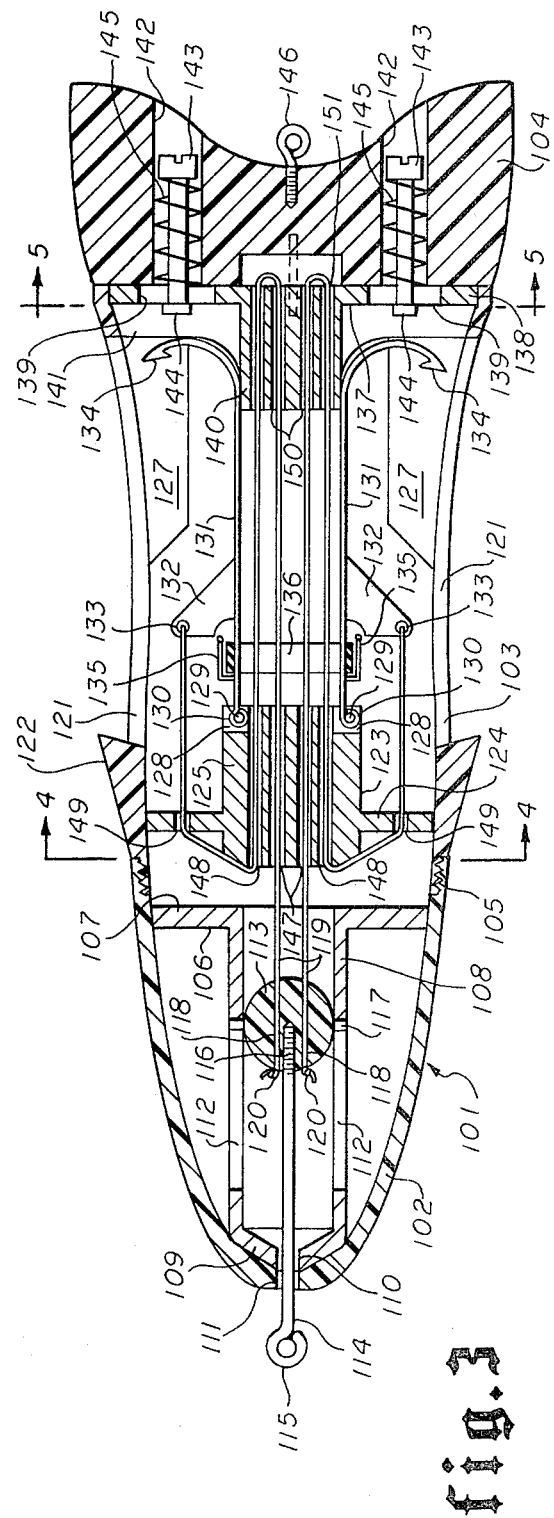
FIG. 3 is a view in longitudinal section of another embodiment of the fishing lure of this invention having elastically retracted fishing hooks.

In FIGS. 3, 4 and 5, there is shown another embodiment of a fishing lure having elastically retracted hooks. In this embodiment, fishing lure 101 comprises a body having three portions 102, 103 and 104. Body portion 102 is hollow and is threadedly connected to body portion 103 by threads 105. Within the hollow interior of the leading end body portion 102, there is provided a supporting member 106 having a flange portion 107 fitting inside body portion 102 and a tubular extension 108. Tubular extension 108 has an end portion 109 which has an aperture 110 aligned with aperture 111 in the end of body portion 102. Tubular extension 108 is provided with a plurality of slots 112 which assist in guiding a ball shaped member 113 for movement longitudinally thereof.

A rod member 114 having an eyelet 115 for receiving and being secured to a fishing line, extends through apertures 110 and 111 into the interior of tubular extension 108 and is threadedly secured at 116 in ball shaped member 113. Ball member 113 is also provided with pins 117 which ride in slots 112 to prevent twisting. Ball member 113 has passages 118 therein through which extend cords 119 which are secured by knots 120.

The central portion 103 of the fishing lure body is hollow, as seen in each of the views and has a plurality of slots 121 therein positioned just rearward of a peripherally extending deflector portion 122.

Body portion 103 has supporting member 123 therein having a peripherally extending flange portion 124 which fits inside body portion 103 and is supported therein. Member 123 has a cylindrical body portion 125 with a plurality of passages therein. The fishing lure, as shown in this embodiment, preferably has four hooks, but a lesser number can be used, if desired. The lure will function with two or three hooks so long as the slots are equally spaced. Body portion 103 is provided with ribs 127 adjacent to slots 121 which function as guides for the fishing hooks.

Tubular extension 125 of supporting member 123 is provided with slots 128 in which there are positioned two pins 129 which secure in place the pivot end portions 130 of specially designed fish hooks 131. Fish hooks 131 have a main body portion on which there are secured lever abutment members 132 having eyelet apertures 133. The outer ends of fish hook 131 terminate in the usual hook portions 134. Fishing hooks 131 also have retaining member 135 thereon which function to hold in place an elastic band, preferably a rubber band 136, which surrounds the fish hooks and biases them toward the retraced position shown in FIG. 3. In this position, elastic rubber band 136 holds the fish hooks 131 retracted within slot 121 and guides 127.

At the trailing end, or tail end, of the fishing lure, the end portion 104 is provided which is secured to the middle portion 103, as shown. The end of middle portion 103 has secured therein a supporting member 137 having a peripherally extending flange portion 138 which forms an end wall for middle portion 103 when secured in place as shown. Flange portion 138 is provided with apertures 139 which receive fasteners which hold tail section 104 in place. The central portion of member 138 includes a tubular extension 140 and ribs 141 which butt the ends of hook 134. Tail section 104 has a plurality of passages 142 in which there are positioned screw fasteners 143 having end fasteners 144 which extend through apertures or slots 139. Springs 145 abut the flange portion 138 and the head of screw fasteners 143 and assist in holding the tail section in place. Tail section 104 also has an eyelet member 146 secured threadedly therein which provides for the attachment of fish attacting accessories.

In the middle section 103, of the fishing lure body, supporting member 143 has a plurality of inner passages or apertures 147 and a plurality of outer apertures or passages 148 in the body portion 125 and a plurality of apertures or passages 149 in the supporting flange portion 124 thereof. In the end closure supporting member 137, the tubular body portion 140 has a plurality of inner passages or apertures 150 and a plurality of outer apertures or passages 151. The lines 119 which extend from ball member 113 extend through the aligned inner passages 147 and 150 and are looped back through the outer passages 151 and 148 and thence through passages or apertures 141 and connected to eyelets 133 in lever abutments 132 on fish hooks 131.

In the fishing lure as shown in FIGS. 3, 4 and 5, elastic rubber band 136 surrounding fish hooks 131, biases the hooks toward a normally retracted position, as shown, in slots 121 and guides 127. When a fish strikes at the lure, and pulls on it, the body of the lure is pulled toward the right or trailing end, as viewed in FIG. 3, relative to supporting rod 114 which is attached by eyelet 115 to the fishing line. When moved in this manner, rod 114 is effective to move ball member 113 to the left, as viewed in FIG. 3, to pull on lines 119 which pull on lever abutments 132 and cause fish hooks 131 to pivot outward. The hooks may be pivoted outward until abutments 132 engage cylindrical extension 125 or the body of the hooks engages the peripheral edge 122 of the fishing lure body.

From the foregoing description of the assembly and operation of this fishing lure, it is seen that the hooks are normally retracted within slots 121 and guides 127 by elastic rubber bands 136 and are not spring loaded toward an extended operating position. It is the pull of the fish on the body of the lure which overcomes the pull of elastic rubber band 136 and causes the fish hooks to be pivoted outward as previously described.

While this invention has been described fully and completely with special emphasis on two preferred embodiments, it should be understood that within the scope of the appended claims, the invention may be practiced otherwise than as specifically described herein.

I claim:

1. A fishing lure comprising
   a lure body having a leading end, a trailing end, and a peripheral surface or periphery, and having a longitudinally extending cavity therein and a plurality of longitudinally extending slots equally spaced around the periphery thereof and opening into said cavity,
   a first fixed member positioned in said cavity toward said leading end of said lure body and including pivotal hook-supporting means
   a plurality of hooks having hook ends and pivot ends, said hooks each having lever abutments thereon and being pivotally supported on said fixed member hook-supporting means and guided in said slots between a retracted position within said lure body at the trailing end thereof and an extended position with said hook ends extending substantially outside said lure body,
   elastically operated means comprising an elastic band surrounding said hooks and biasing said hooks toward said retracted position,
   said elastically operated means including a ball shaped supporting member supported and guided for longitudinal movement in said cavity and operable upon movement in one direction to effect movement of said hooks to said extended position and upon movement in another direction to permit said hooks to move to said retracted position,
   a second fixed member positioned in said cavity at the leading end of said lure body and being of tubular construction and having said ball-shaped member guided for longitudinal movement therein
   a third fixed member at the trailing end portion of said cavity,
   said first and third fixed members having a plurality of aligned apertures therein,
   a plurality of lines connected from said ball-shaped member extending through apertures in said first and third fixed members and back through apertures in said first fixed member and connected to said lever abutments
   fishing lure supporting means comprising a rod-shaped member having an eye outside said cavity for connection to a fishing line and extending into said cavity and secured in said ball-shaped supporting member for effecting longitudinal movement thereof to move said hooks to said extended position when said lure is pulled by a fish.

* * * * *